United States Patent
Peters et al.

(10) Patent No.: US 6,590,969 B1
(45) Date of Patent: Jul. 8, 2003

(54) METHOD TO ROUTE AN INCOMING CALL, TELECOMMUNICATION TERMINAL, AND DESTINATION TERMINAL SELECTION ARRANGEMENT

(75) Inventors: Marco Johannes Hubertus Peters, NS Bergen op Zoom (NL); Jean Vosters, Temse (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/456,482

(22) Filed: Dec. 7, 1999

(30) Foreign Application Priority Data

Dec. 22, 1998 (EP) .............................................. 98403273

(51) Int. Cl.⁷ ................................................ H04M 3/42
(52) U.S. Cl. .................................. 379/211.02; 455/417
(58) Field of Search ....................... 379/211.02, 212.01; 455/417, 414, 459

(56) References Cited

U.S. PATENT DOCUMENTS

| | | | |
|---|---|---|---|
| 5,416,834 A | * 5/1995 | Bales et al. | .................. 379/211 |
| 5,657,382 A | 8/1997 | Tamagawa et al. | |
| 6,134,433 A | * 10/2000 | Joong et al. | ................. 379/211 |
| 6,188,758 B1 | * 2/2001 | Christensen et al. | ......... 379/211 |

FOREIGN PATENT DOCUMENTS

| | | |
|---|---|---|
| EP | 0 550 179 A2 | 7/1993 |
| EP | 0 618 745 A1 | 10/1994 |
| WO | WO 98/26621 | 6/1998 |

* cited by examiner

*Primary Examiner*—Creighton Smith
(74) *Attorney, Agent, or Firm*—Sughrue Mion, PLLC

(57) ABSTRACT

If a terminal (MOB_T) receives an incoming call and this receiving terminal (MOB_T) is not suitable to handle this incoming call, the receiving terminal (MOB_T) detects the service type of the incoming call, and notifies this service type to a destination terminal selecting arrangement (PRES_GATH). The destination terminal selecting arrangement (PRES_GATH) registers the presence and capabilities of all terminals (FAX_T, BB_T, MOB_T) within a certain area, and upon receipt of the service type of the incoming call selects the most suitable terminal (FAX_T) within the area of the receiving terminal (MOB_T) to handle the call. The destination terminal selecting arrangement (PRES_GATH) thereupon notifies the address of this most suitable terminal (FAX_T) to the receiving terminal (MOB_T) so that the receiving terminal (MOB_T) can forward the incoming call to the most suitable terminal (FAX_T).

8 Claims, 2 Drawing Sheets

METHOD TO ROUTE AN INCOMING CALL, TELECOMMUNICATION TERMINAL, AND DESTINATION TERMINAL SELECTION ARRANGEMENT

BACKGROUND OF THE INVENTION

The present invention relates to a method to route in a telecommunication system an incoming call to a suitable destination terminal a related method to select the suitable destination terminal, a receiving terminal able to perform the method to route the call defined in, a destination terminal selecting arrangement able to perform the method to select the suitable destination terminal, and a telecommunication system including such a receiving terminal and such a destination terminal selecting arrangement.

Such a method to route an incoming call to a suitable destination terminal and related equipment are already known in the art, e.g. from the U.S. Pat. No. 5,657,382 entitled 'Telecommunication system having capability of notifying the occurrence of forwarding of an incoming call to a terminal'. Therein, FIG. 1 shows a conventional telecommunication system that has the capability of transferring or forwarding a call from a receiving terminal to a destination terminal. In the known telecommunication system, a central control unit and terminal registration memory in a switching station co-operate to forward a call. The registration memory registers a terminal together with the address or dial number whereon the terminal can be reached and information indicating whether the call transfer service is activated or not for that terminal. If a call is received by a first terminal whose call transfer service is activated, the switching station automatically transfers the call to a second terminal entitled to receive a call sent to the first mentioned terminal. Thus, in the known system, all calls sent to the first terminal are automatically transferred to the second terminal if the call transfer service is activated for these two terminals. In such a system, the destination terminal, i.e. the first terminal in case the call transfer service is not activated or the second terminal in case the call transfer service is activated, may not be the most suitable terminal to handle the call. The destination terminal even may be unable to handle the call. If for example the first terminal is a fixed telephone terminal, the second terminal is a mobile telephone set, and both terminals have their call forwarding service activated, a fax call received by the fixed terminal will be transferred automatically to the mobile terminal which is unable to handle this call so that the call will be left unanswered.

SUMMARY OF THE INVENTION

It is an object of he present invention to provide a method to forward a call to a suitable destination terminal and equipment to perform this method as described above, but wherein a call coming in on a received terminal is forwarded to the most suitable destination terminal whereto the call may be forwarded, so that calls are always received with the highest possible quality.

According to the invention, this object is achieved by the method to route an incoming call from a receiving terminal to a destination terminal as defined in claim 1, the method to select a suitable destination terminal as defined by claim 2, the receiving terminal able to perform the method to route an incoming call as defined in claim 3, the destination terminal selecting arrangement able to perform the method of selecting a suitable destination terminal as defined in claim 4, and the telecommunication system including such a receiving terminal and such a destination terminal selecting arrangement as defined in claim 8.

Indeed, if all terminals within a certain area register their presence and capabilities with a destination terminal selecting arrangement, this destination terminal selecting arrangement is able to select within a certain area the terminal with the best capabilities to handle an incoming call. A terminal which receives an incoming call thereto determines the type of service where the call belongs to, for example a fax call or an electronic mail, and indicates to the destination terminal selecting arrangement the type of call it has received. The destination terminal selecting arrangement thereupon determines the most suitable terminal within the area of the receiving terminal to handle the call and informs the receiving terminal about the address of this most suitable terminal so that the receiving terminal can forward the incoming call to the address of the most suitable terminal, thereby ensuring a high quality receipt of the call. Summarising, according to the present invention, incoming calls are intelligently forwarded to the most suitable destination terminal after a decision where to forward the call, based on the type of service that is associated with the incoming call, has been taken by an arrangement that collects terminal capabilities information.

It is to be noted that the term 'area' used in the claims and throughout the remainder of the description does not necessarily mean a geographical area with limited boundaries. An area, according to the present invention, is a collection of terminals which are allowed to transfer calls between one another by their owners. Thus, the fixed and mobile telephone terminals, owned by a single person and able to receive voice calls, the facsimile terminal of this person's secretary, able to receive fax calls, and the personal computer of this person's neighbour or employer, able to receive data files and electronic mail, may belong to the same area although their physical locations can differ widely.

BRIEF DESCRIPTION OF THE INVENTION

A Another remark is that the term 'call' used in the claims should not be interpreted as covering circuit switched communication only. Any service request, like for instance a request for an internet-like multimedia service is meant to fall within the scope of the term 'call'.

It is also to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the destination terminal selecting arrangement according to the present invention is defined in claim 5.

In this way, by automatically de-registering terminals which have not confirmed their presence in a certain area during a predetermined time interval, it is avoided that the terminal registration memory of the destination terminal selecting arrangement contains invalid information leading to call transfers to terminals which are no longer present within the area wherein a call has to be forwarded.

Another feature of the destination terminal selecting arrangement according to the present invention is defined by claim 6.

Indeed, the destination terminal selecting arrangement can be special hardware equipment or software which can run on any device, allowing this device to become destination terminal selector for one or more area's. The in hardware or software implemented destination terminal selecting arrangement for example may be integrated in a network switching node as indicated by claim 6 or in a terminal as indicated by claim 7.

The above mentioned and other objects and features of the invention will become more apparent and the invention itself will be best understood by referring to the following description of an embodiment taken in conjunction with the accompanying drawings wherein.

Figure 1:
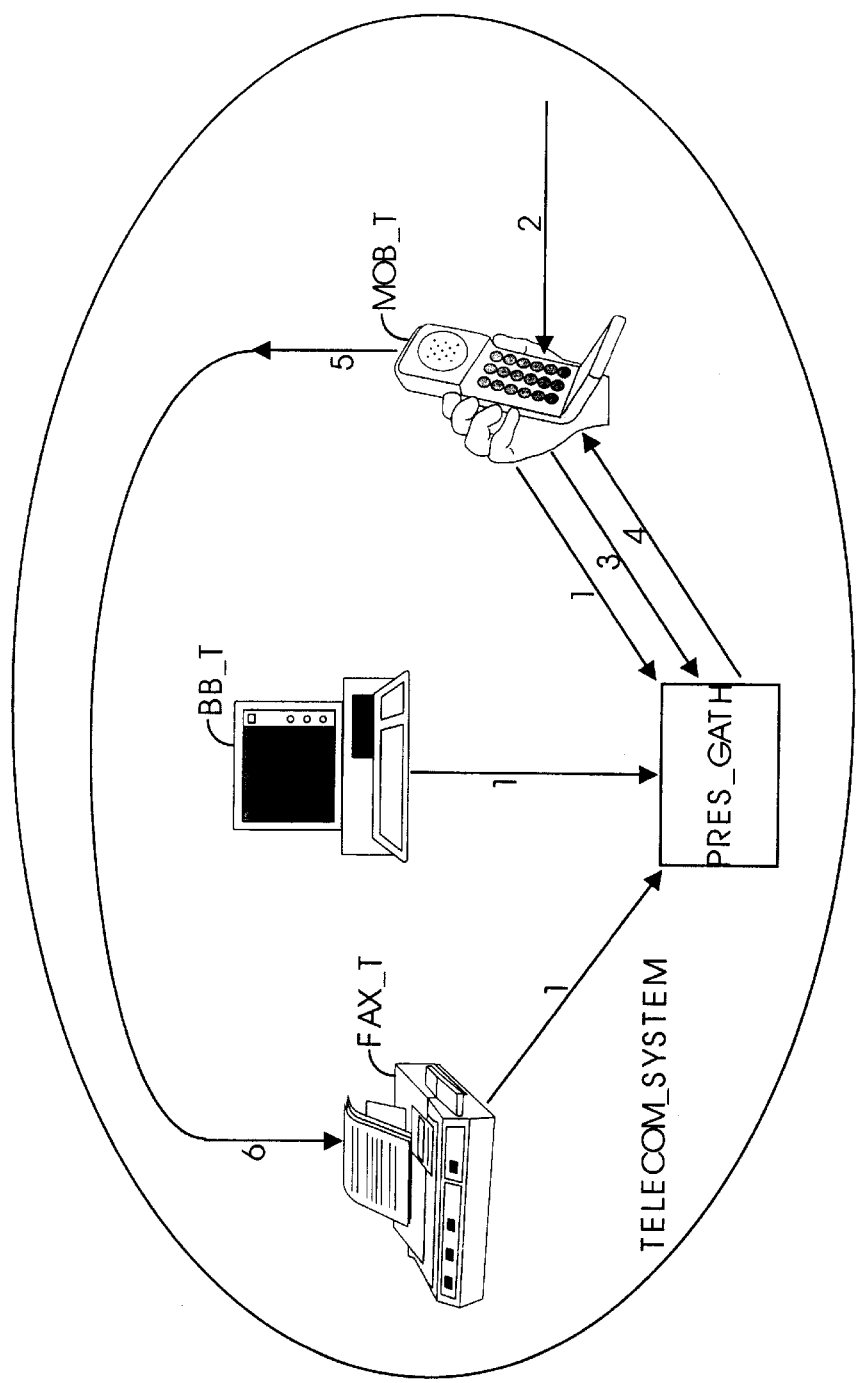
FIG. 1 shows an embodiment of a telecommunication system TELECOM_SYSTEM according to the present invention, including an embodiment of the receiving terminal MOB_T according to the present invention and an embodiment of the destination terminal selecting arrangement PRES_GATH according to the present invention.

The telecommunication system TELECOM_SYSTEM of FIG. 1 includes a destination terminal selecting arrangement, named the presence gatherer PRES_GATH hereafter, a facsimile terminal FAX_T, a broadband terminal BB_T and a mobile terminal MOB_T. The telecommunication system TELECOM_SYSTEM further includes links and network nodes interconnecting the different terminals, but these links and nodes are not drawn in FIG. 1 to avoid overloading the drawing.

The handling of an incoming call according to the present invention is illustrated by the numbered arrows 1, 2, 3, 4, 5 and 6. The facsimile terminal FAX_T, the broadband terminal BB_T and the mobile terminal MOB_T are supposed to belong to the same area. In the light of the present invention, this does not necessarily imply that the facsimile terminal FAX_T, the broadband terminal BB_T and the mobile terminal MOB_T belong to the same owner or are located within a geographical area with limited distances. The facsimile terminal FAX_T, the broadband terminal BB_T and the mobile terminal MOB_T are said to belong to the same area because one of these terminals is allowed to handle a call received by another terminal or, in other words, a call received by one of these terminals may be forwarded to another terminal. The mobile terminal MOB_T may for instance be possessed by an individual person, whereas the facsimile terminal FAX_T belongs to this person's secretary and the broadband terminal BB_T is a portable PC owned by the person's employer. The facsimile terminal FAX_T, the broadband terminal BB_T and the mobile terminal MOB_T each register their presence within the already mentioned area to the presence gatherer PRES_GATH via registration messages sent thereto. The registration of the facsimile terminal FAX_T, the broadband terminal BB_T and the mobile terminal MOB_T is indicated by the arrow with label 1 in FIG. 1. In addition to their presence within the same area, the presence gatherer PRES_GATH registers the addresses of the terminals FAX_T, BB_T and MOB_T and memorises for each of the terminals its capabilities with respect to handling of calls. The presence gatherer PRES_GATH thus registers the fax number of the facsimile terminal FAX_T and memorises that this terminal FAX_T is able to receive fax messages, registers the IP (Internet Protocol) address of the broadband terminal BB_T and memorises that this terminal is able to receive data files and e-mails, and registers the telephone number of the mobile terminal MOB_T and memorises that this terminal is able to receive voice calls and short messages.

In FIG. 1 it is supposed that a fax message is received by the mobile terminal MOB_T. This is indicated by the number 2 in FIG. 1. The mobile terminal MOB_T detects that it is not able to handle the incoming fax message and thereupon informs the presence gatherer PRES_GATH of the fact that it has received a fax message. This information flow is marked with the number 3 in FIG. 1. It is then the task of the presence gatherer PRES_GATH to determine within the area where the mobile terminal MOB_T belongs to the most suitable terminal to receive the incoming fax message. The presence gatherer PRES_GATH will conclude that the secretary's facsimile terminal FAX_T is best suited to receive the fax message, reads the address of this facsimile terminal FAX_T out of its registration memory and sends this address to the mobile terminal MOB_T. The transfer of the address of the facsimile terminal FAX_T from the presence gatherer PRES_GATH to the mobile terminal MOB_T is referenced to by number 4 in FIG. 1. The received address is used by the mobile terminal MOB_T to forward the incoming fax message to the facsimile terminal FAX_T. This call forward, which may be realised in accordance with traditional call forwarding techniques, carries number 5 in FIG. 1. The secretary's facsimile terminal FAX_T receives the fax message, which is indicated by number 6 in FIG. 1, and handles the fax message. Summarising, the receiving terminal MOB_T of a call, in this case a fax call, forwards this call to the most suitable terminal FAX_T to handle this type of call within the same area, after it has received the address of this most suitable terminal FAX_T from the presence gatherer PRES_GATH, a device that registers the presence and capabilities of terminals. A more detailed explanation of the processing inside the mobile terminal MOB_T and the presence gatherer PRES_GATH will be given in the following paragraphs wherein reference is made to FIG. 2 and FIG. 3 respectively.

Figure 2:
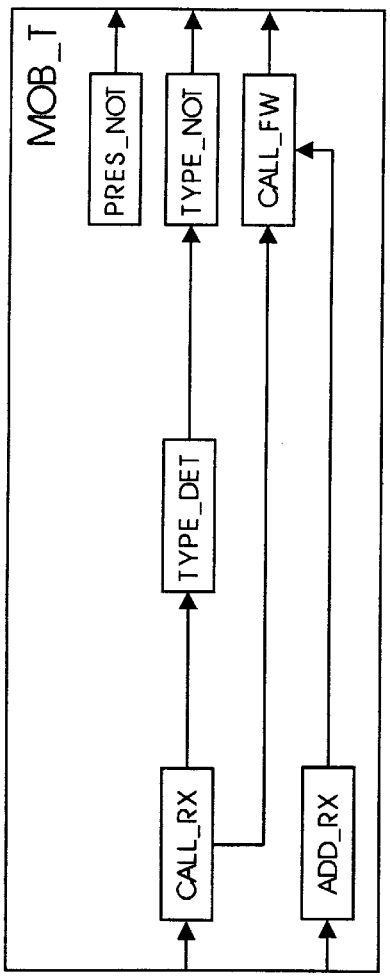
FIG. 2 is a functional block scheme of the receiving terminal MOB_T in the telecommunication system TELECOM_SYSTEM of FIG. 1.

The elements of the mobile terminal MOB_T of FIG. 1 that are relevant in view of the present invention are drawn in FIG. 2. As is seen from FIG. 2, this mobile terminal MOB_T includes a presence notification unit PRES_NOT, a call receiving unit CALL_RX, a type determination unit TYPE_DET, a type notification unit TYPE_NOT, an address receiving unit ADD_RX, and a call forwarding unit CALL_FW.

The presence notification unit PRES_NOT is provided with an output terminal coupled to a first output terminal of the mobile terminal MOB_T. The call receiving unit CALL_RX, the type detection unit TYPE_DET and the type notification unit TYPE_NOT are cascade coupled between a first input terminal of the mobile terminal MOB_T and a second output terminal thereof. The call receiving unit CALL_RX further is equipped with a terminal interconnected with an input terminal of the call forwarding unit CALL_FW, and the latter call forwarding unit CALL_FW is via its output coupled to a third output terminal of the mobile terminal MOB_T. A second input terminal of the mobile terminal MOB_T serves as input terminal for the address receiving unit ADD_RX, which further has an output terminal coupled to a control input of the call forwarding unit CALL_FW. A skilled person will appreciate that in a realistic implementation of the mobile terminal MOB_T the two input terminals on the one hand and the three output terminals on the other hand are combined into respectively a single input terminal and a single output terminal. To clarify the role of the different units drawn in FIG. 2 however, their inputs and outputs are kept separated if different kinds of information are received or sourced via these inputs or outputs.

The presence notification unit PRES_NOT regularly sends a registration message to the presence gatherer PRES_GATH to indicate its presence within a first area where also the facsimile terminal FAX_T and the broadband terminal BB_T of FIG. 1 belong to, and to inform the presence gatherer PRES_GATH of the telephone number whereon the mobile terminal MOB_T can be reached and of its capability to handle both telephone calls and short messages sent in accordance with the well-known SMS (Short Message Service) protocol. The incoming fax call, already mentioned above, enters the mobile terminal MOB_T via the first input terminal and is received by the call receiving unit CALL_RX which notes that the mobile terminal MOB_T is not able to handle the fax call. The call receiving unit CALL_RX for this reason does not apply the fax call to the circuitry in the mobile terminal MOB_T that processes normal telephone calls and that is not drawn in FIG. 2. Instead, the fax call is applied to both the type detection unit TYPE_DET and the call forwarding unit CALL_FW. The latter call forwarding unit CALL_FW holds the fax call until it receives an address of a destination terminal at its control input. The type detection unit TYPE_DET on the other hand determines that the incoming call is a fax type call, and instructs the type notification unit TYPE_NOT to notify to the presence gatherer PRES_GATH that a call of the fax type has been received by the mobile terminal MOB_T and cannot be handled thereby. The mobile terminal MOB_T thereupon waits until it receives the address of the secretary's facsimile terminal FAX_T on its second input terminal. The address receiving unit ADD_RX receives this address and applies it to the control terminal of the call forwarding unit CALL_FW which automatically forwards the fax call to the facsimile terminal FAX_T. After receipt of the call by the destination terminal FAX_T, receipt of the call may be confirmed via a message sent to the receiving terminal MOB_T so that the latter knows that the call it has received is well handled.

Figure 3:
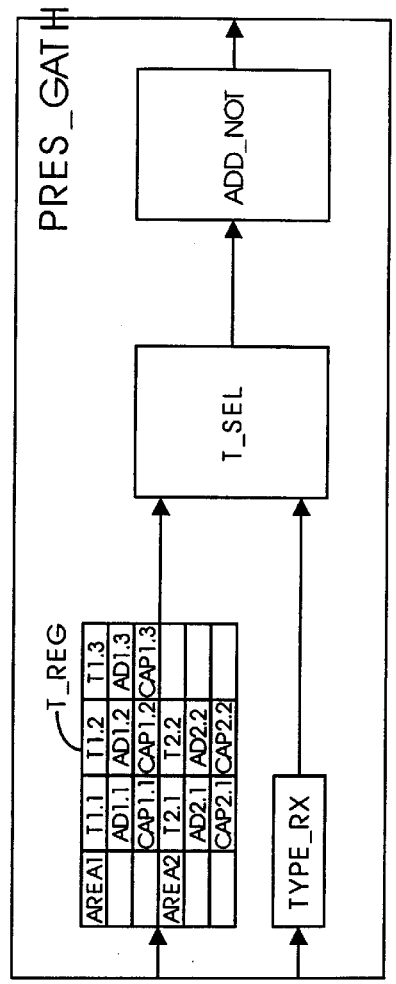
FIG. 3 is a functional block scheme of the destination terminal selecting arrangement PRES_GATH of FIG. 1.

The essential elements of the presence gatherer PRES_GATH of FIG. 1 are drawn in FIG. 3. The presence gatherer PRES_GATH includes a terminal registration memory T_REG, a type receiving unit TYPE_RX, a terminal selecting unit T_SEL and an address notification unit ADD_NOT.

An input terminal of the terminal registration memory T_REG is coupled to a first input terminal of the presence gatherer PRES_GATH. The terminal registration memory T_REG further is equipped with an output terminal coupled to a first input terminal of the terminal selecting unit T_SEL whose output is coupled to the output terminal of the presence gatherer PRES_GATH via the address notification unit ADD_NOT. The type receiving unit TYPE_RX is coupled between a second input terminal of the presence gatherer PRES_GATH and a second input terminal of the terminal selecting unit T_SEL.

The terminal registration memory T_REG has received a registration message from the facsimile terminal FAX_T in FIG. 1 indicating its presence within the first area AREA1. An identifier T1.1, the address AD1.1 and the capabilities CAP1.1 of this facsimile terminal FAX_T are memorised by the terminal registration memory T_REG. In a similar way, the terminal registration memory T_REG has received registration messages from the broadband terminal BB_T and the mobile terminal MOB_T in FIG. 1 indicating their presence within the same first area AREA1. The terminal registration memory T_REG hence also memorises an identifier T1.2, the address AD1.2 and capabilities CAP1.2 of the broadband terminal BB_T, and an identifier T1.3, the address AD1.3 and the capabilities CAP1.3 of the mobile terminal MOB_T. The terminal registration memory T_REG drawn in FIG. 3 further contains information concerning a fourth terminal with identifier T2.1, address AD2.1 and capabilities CAP2.1 and a fifth terminal with identifier T2.2, address AD2.2 and capabilities CAP2.2. This fourth and fifth terminal however belong to a second area AREA2, and consequently cannot handle calls received by any of the terminals FAX_T, BB_T and MOB_T drawn in FIG. 1. The message notifying that the mobile terminal MOB_T of FIG. 1 or FIG. 2 has received a call of the fax type enters the presence gatherer PRES_GATH via its second input terminal and is received there by the type receiving unit TYPE_RX. This type receiving unit TYPE_RX interprets the received notification and instructs the terminal selecting unit T_SEL to search for the most suitable terminal within the first area AREA1 to handle a fax call. The terminal selecting unit T_SEL consults the terminal registration memory T_REG, and more particularly the information concerning the capabilities CAP1.1, CAP1.2 and CAP1.3 of terminals T1.1, T1.2 and T1.3 whose presence within the first area AREA1 is registered. The terminal selecting unit T_SEL will conclude that T1.1, i.e. the facsimile terminal T_FAX of FIG. 1 is the most suitable terminal in the first area AREA1 to handle a fax call and will continue by reading from the terminal registration memory T_REG the address AD1.1 of this most suitable terminal T1.1. This address AD1.1, which in case of the facsimile terminal FAX_T is the fax number whereon this facsimile terminal FAX_T can be reached, is applied to the address notification unit ADD_NOT and the terminal selecting unit T_SEL instructs this address notification unit ADD_NOT to notify the address AD1.1 to the second input terminal of the mobile terminal MOB_T whose structure has been described above.

Although the presence gatherer PRES_GATH of FIG. 3 is drawn as a separately located device in FIG. 1, means that register the presence and capabilities of terminals within certain areas and that select, upon request of a call receiving terminal, the most suitable destination terminal to route the call to, may alternatively be integrated in a network node of the telecommunication system or even within a terminal. Moreover, these means may be concentrated into a single device that performs the above described functions for the whole network, or may be distributed amongst several devices which each perform the above described functions for one or a limited number of areas.

It is further noticed that, although not drawn in FIG. 3, the presence gatherer PRES_GATH contains a de-registration unit connected to the terminal registration memory T_REG and responsible for de-registration of terminals which do not regularly confirm their presence within a certain area. In this way, it is avoided that the terminal registration memory T_REG becomes filled with information concerning terminals which are no longer present within the area wherein they are registered.

It is also noticed that embodiments of the present invention wherein the call forwarding unit CALL_FW is not comprised by the receiving terminal MOB_T but integrated in a network element or even in the presence gatherer PRES_GATH, for instance a switching node, can be thought off. If the call forwarding unit forms part of such a network element, the address of the destination terminal FAX_T of course does not have to be notified to the receiving terminal but should be applied to the network element where the call forwarding unit CALL_FW is integrated in. If the call id forwarded to the destination terminal FAX_T by a network element, this network element or the destination terminal FAX_T may confirm receipt of the call to the receiving terminal MOB_T so that the latter becomes aware of the fact that the call has been handled well.

Also a remark is that the above mentioned services, i.e. mobile telephony, facsimile, e-mail, internet-like service requests, data file traffic and the short message service are only given by way of example and certainly do not limit the applicability of the present invention. Any terminal, like for example a POTS (Plain Old Telephone Service) terminal, a screenphone, a television, and so on, is adapted to make use of the advantageous call routing technique according to the present invention when equipped with the elements drawn in FIG. 2, irrespective of the services that this terminal is able to support.

Furthermore, it is remarked that an embodiment of the present invention is described above in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. A method of routing in a telecommunication system an incoming call from a receiving terminal to a suitable destination terminal, said method comprising the steps of:
   receiving said incoming call in said receiving terminal;
   detecting a service type associated with said incoming call;
   notifying a destination terminal selecting arrangement of said service type, said destination terminal selecting arrangement registering a presence and capabilities of a plurality of terminals including said receiving terminal;
   receiving at said receiving terminal an address of said suitable destination terminal from said destination terminal selecting arrangement, said suitable destination terminal having the best capabilities to handle calls of said service type; and
   forwarding said incoming call from said receiving terminal to said suitable destination terminal.

2. A method of selecting a suitable destination terminal for routing thereto in a telecommunication system an incoming call received in a receiving terminal, said method comprising the steps of:
   registering presence and capabilities of a plurality of terminals within a certain area including said suitable destination terminal and said receiving terminal;
   receiving from said receiving terminal a notification of a service type associated with said incoming call;
   selecting said suitable destination terminal as being a terminal amongst said plurality of terminals with best capabilities to handle calls of said service type of said incoming call; and
   notifying said receiving terminal of an address of said suitable destination terminal.

3. A receiving terminal suitable to receive in a telecommunication network an incoming call and to route said incoming call to a suitable destination terminal, said receiving terminal comprising:
   call receiving means, coupled to a first input terminal of said receiving terminal and adapted to receive said incoming call;
   call forwarding means, coupled between said call receiving means and a first output terminal of said receiving terminal, and adapted to forward said incoming call to said suitable destination terminal;
   presence notification means, coupled with its output to a second output terminal of said receiving terminal and adapted to provide notification of presence and capabilities of said receiving terminal to a destination terminal selecting device which is able to register presence and capabilities of terminals within a certain area;
   type detection means, coupled to said call receiving means and adapted to detect a service type associated with said incoming call;
   type notification means, coupled between said type detection means and a third output terminal of said receiving terminal, and adapted to provide notification of said service type of said incoming call to said destination terminal selecting arrangement; and
   address receiving means, coupled to a second input terminal of said receiving terminal and having an output coupled to a control input of said call forwarding means, said address receiving means being adapted to receive an address of said suitable destination terminal from said destination terminal selecting arrangement and to apply said address to said call forwarding means.

4. A destination terminal selecting arrangement suitable for use in a telecommunication system wherein an incoming call received in a receiving terminal has to be routed to a suitable destination terminal, said destination terminal selecting arrangement comprising:
   terminal registration means, coupled to a first input terminal of said destination terminal selecting arrangement and adapted to register presence and capabilities of a plurality of terminals within a certain area including said suitable destination terminal and said receiving terminal;
   type notification receiving means, coupled to a second input terminal of said destination terminal selecting device and adapted to receive from said receiving terminal a notification of a service type associated with said incoming call;
   terminal selecting means, coupled to said terminal registration means and to said type notification receiving means, and adapted to select said suitable destination terminal as being a terminal amongst said plurality of terminals with best capabilities to handle calls of said service type of said incoming call; and
   address notifying means, coupled between said terminal selecting means and an output terminal of said destination terminal selecting arrangement, and adapted to provide notification of an address of said suitable destination terminal to said receiving terminal.

5. A destination terminal selecting arrangement according to claim 4, further comprising automatic de-registration means, being coupled to said terminal registration means and being adapted to automatically de-register a terminal amongst said plurality of terminals which does not provide re-notification of its presence in said area to said destination terminal selecting arrangement during a certain time interval.

6. A destination terminal selecting arrangement according to claim 4, wherein said destination terminal selecting arrangement is incorporated in a network node of said telecommunication system.

7. A destination terminal selecting arrangement according to claim 4, wherein said destination terminal selecting arrangement is incorporated in a terminal.

8. A telecommunication system comprising:

a plurality of terminals interconnected via a network of links and network nodes, at least one receiving terminal as defined in claim 3, and at least one destination terminal selecting arrangement.

* * * * *